Sept. 19, 1967  D. G. SPRIGINGS ET AL  3,342,954
ELECTRIC CURRENT TROLLEY CONDUCTOR CONSTRUCTION
Original Filed June 30, 1964  3 Sheets-Sheet 1
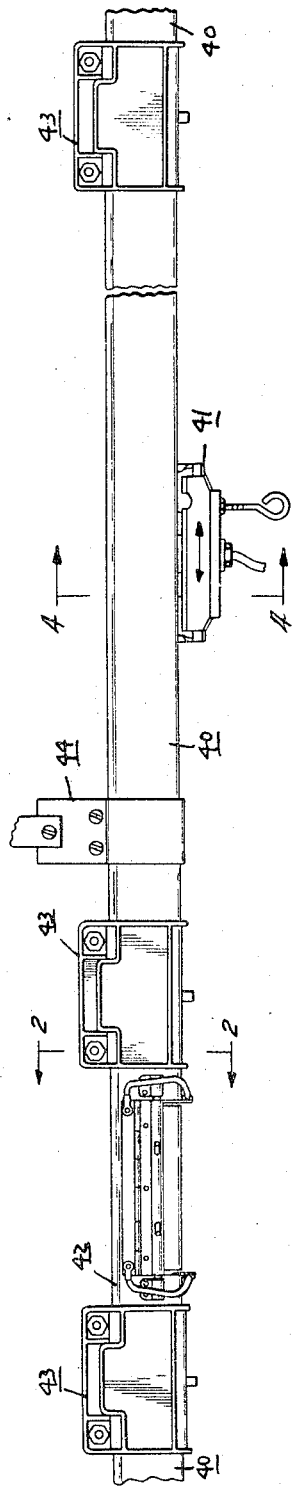
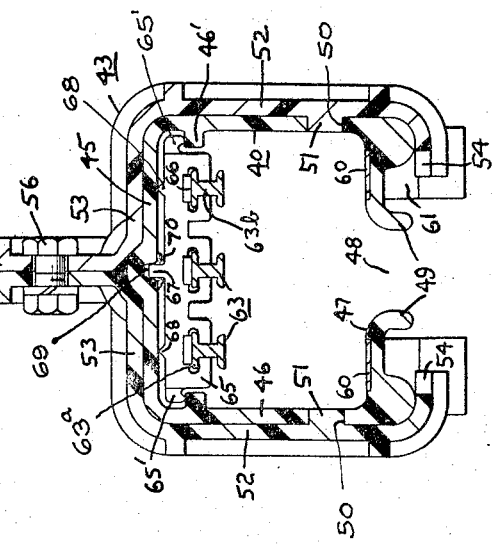
INVENTOR.
DONALD G. SPRIGINGS
GERALD E. MARTIN
ATTORNEY Sept. 19, 1967  D. G. SPRIGINGS ET AL  3,342,954
ELECTRIC CURRENT TROLLEY CONDUCTOR CONSTRUCTION
Original Filed June 30, 1964  3 Sheets-Sheet 2

INVENTOR.
DONALD G. SPRIGINGS
GERALD E. MARTIN

Earl Edelson
ATTORNEY

Sept. 19, 1967  D. G. SPRIGINGS ET AL  3,342,954
ELECTRIC CURRENT TROLLEY CONDUCTOR CONSTRUCTION
Original Filed June 30, 1964  3 Sheets-Sheet 3

INVENTOR.
DONALD G. SPRIGINGS
GERALD E. MARTIN
Leon Edelson
ATTORNEY

United States Patent Office

3,342,954
Patented Sept. 19, 1967

3,342,954
ELECTRIC CURRENT TROLLEY CONDUCTOR CONSTRUCTION
Donald G. Sprigings, Mystic, Conn., and Gerald E. Martin, Lynchburg, Va., assignors to H. K. Porter Company, Inc., Lynchburg, Va., a corporation of Delaware
Original application June 30, 1964, Ser. No. 379,137. Divided and this application Nov. 7, 1966, Ser. No. 592,387
6 Claims. (Cl. 191—45)

This application is a division of our copending application Ser. No. 379,137, filed June 30, 1964.

This invention relates generally to enclosed trolley busway systems in which the structural support, protective housing and bus insulation are all combined into one thermosetting plastic enclosure, and more particularly to a trolley which may be employed in such system, it being among the objects of this invention to provide a novel trolley collector which incorporates wheels or skids and rides on tracks formed on the interior of the enclosure so that the trolley is supported by the enclosure and not from the current conductors to thereby render the conductor system independent of the support requirements of the trolley collector.

The foregoing and other objects of our invention will become clear from a reading of the following specification in conjunction with an examination of the appended drawings, wherein:

FIGURE 1 illustrates a side elevational view of the enclosed trolley busway system, which is described in detail in our above mentioned copending application and which description thereof is included herein by reference thereto;

FIGURE 2 is a vertical sectional view taken through an enclosure coupling section as would be seen when viewed along the line 2—2 of FIGURE 1, the showing of FIGURE 2 being on an enlarged scale;

In the several figures, like elements are denoted by like reference characters.

Figure 3:
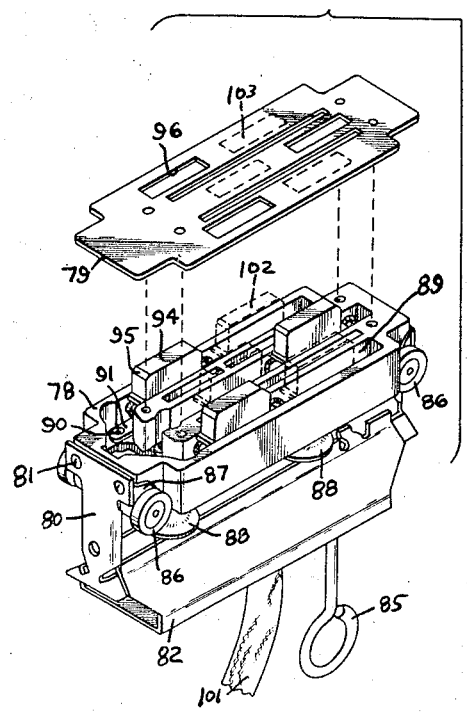
FIGURE 3 is a perspective view, partly exploded, of the trolley collector device constructed in accordance with and embodying the principles of the present invention, said trolley being partly visible in side elevation in the showing of FIGURE 1.

Referring now to the drawings and more particularly to FIGURES 1 and 2, it will be observed that the trolley of the present invention is designed for use in an enclosed trolley busway system including a longitudinally extending extruded enclosure section 40 within which rides the trolley collector designated generally as 41, the side opening access-door-containing enclosure section 42, enclosure sections couplings 43 and supporting hangers 44, all as described more fully in our above-mentioned copending application.

As best seen in FIGURES 2 and 3 the several interconnected enclosure sections 40 which make up the trolley busway system are each generally rectangular in cross section having an upper wall 45, opposite depending side walls 46 and a pair of inwardly projecting bottom walls 47 separated by a longitudinally centrally extending slot 48 defined by the down turned spaced apart flanges 49 which form the proximate facing edges of the bottom walls 47. The side walls 46 are provided near their tops with longitudinally extending inwardly projecting ledges or shoulders 46' which face one another and provide physical support for the conductor rails support blocks hereinafter described. The side walls 46 and top wall 45 of the enclosure sections 40 are cut back at an angle from points on the side walls spaced somewhat upward from the bottom walls 47 so that the interior of the enclosure sections at the ends thereof are accessible from the top and sides. Punched or drilled through the side walls 46 proximate the ends thereof are apertures 50 of proper size, shape and position to have projected thereinto complementally formed buttons 51 projecting inward from the inside surface of the side walls 52 of each half of the enclosure sections coupling devices 43.

As best seen in FIGURE 2, the side walls 52, top wall sections 53 and inturned bottom walls 54 of the enclosure sections coupling devices 43 close fittingly surface engage the top, side and bottom walls of the enclosure section 40 so that the four buttons 51 of each coupling half project through the enclosure apertures 50 to interlock the ends of adjacent enclosure sections when the vertically extending flanges 55 of the enclosure coupling halves 43 are fixedly secured together by the nuts and bolts 56 projected through the aligned apertures in said flanges 55.

Extending longitudinally along and bonded downward upon the upper surface of the enclosure bottom walls 47 are flat electrically conductive strips 60 having downturned ends extending below the housing bottom walls 47. As is more particularly shown and described in our pending application aforesaid, these ends abut one another when two enclosure sections are interconnected, the abutting ends being mechanically electrically connected to one another. The conductive strips 60 are connected to an electrical ground when the system is placed in operation and electrically ground the frame of the trolley collector, as will be subsequently seen, to thereby prevent any shock hazard to personnel utilizing the system.

The busway conductor rails 63, as best seen in FIGURE 2, are of 1-shaped in cross section and are slidable endwise longitudinally into and through grooved formations formed in the conductor support block 65. These grooved formations in the conductor support block are of the same general cross sectional shape as the upper half of the conductor rails 63 in that such formations have a horizontally extending open region of the same general shape but slightly larger than the upper flange 63a of the conductor rails and have a depending vertical slot portion of the same width as the web 63b of the conductor rails 63. Disposed within the conductor rail flange receiving portion of the grooved formations are resilient biasing strips 66 which hold the conductor rails 63 in stable position within the support block 65.

The conductor rail support blocks 65 are provided with longitudinally extending side flanges 65' and a longitudinally extending top rib 67 centered between a pair of similarly extending parallel ribs 68—68, the central rib 67 extending upward above the surface of the block to a greater extent than the laterally positioned ribs 68—68. The support block side flanges 65' seat upon the enclosure side wall shoulders 46' whereby the weight of the conductor rails of the system are supported by the enclosure. As best seen in FIGURE 2, the support block central rib 67 projects upward into a groove 69 formed in the underside of the enclosure top wall 45 while the lateral ribs 68 are seated against the undersurface of the enclosure top wall 45. The conductor support block 65 is fixedly held in position within the enclosure by a bonding agent 70 which securely bonds the support block central rib 67 into the enclosure groove 69 in the enclosure top wall 45.

The enclosure sections 40 may be made of any convenient length as may be the conductor rails 63, but in general standard lengths will be such that enclosure sections and conductor rails will be of the same length so that mechanical coupling of the enclosures and electrical splicing of the conductor rails may be accomplished at the same point. It is of course understood that the conductor rail splicing is effected before the aligned enclosure sections 40 are secured together by the coupling sections 43.

Figure 4:
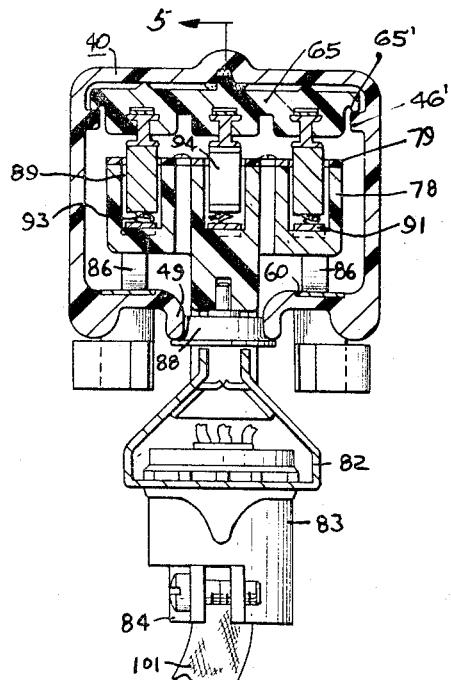
FIGURE 4 is a vertical cross sectional view, on an enlarged scale, through the busway system and associated trolley collector device as would be seen when viewed along the lines 4—4 of FIGURE 1.
Figure 5:
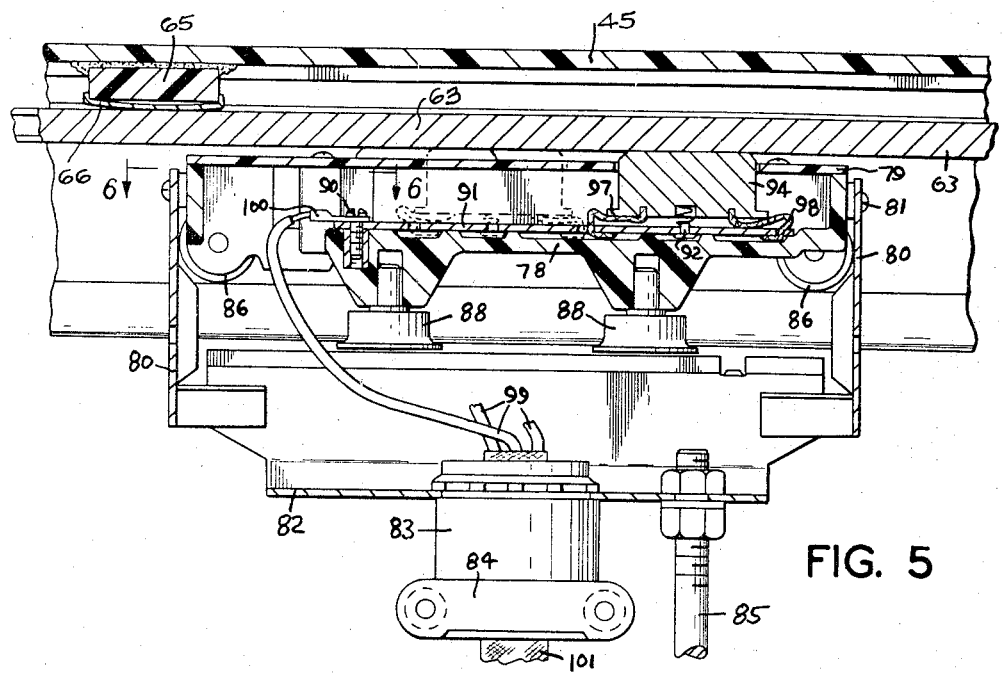
FIGURE 5 is a longitudinal vertical sectional view through the busway enclosure and trolley collector as would be seen when viewed along the line 5—5 of FIGURE 4.
Figure 6:
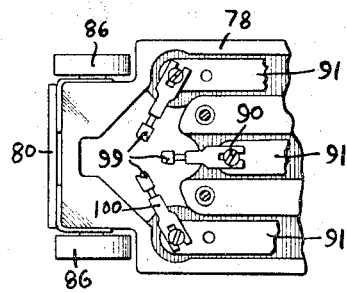
FIGURE 6 is a fragmentary plan view of the electrical connections to the trolley collector bus bar contact system taken below the insulating cover of the trolley as would be seen when viewed along the line 6—6 of FIGURE 5.

The trolley collector 41 of the present invention comprises a main insulator body 78 for the collector shoes, an upper insulating cover plate 79, and a depending electrically conductive structure formed of metal parts and including the opposite end plates 80 physically secured to the insulator body 78 as by means of the screws 81 and welded or otherwise secured at their lower ends to a cable clamping bushing support 82 extending therebetween. The cable clamping bushing 83 with its screw supported clamping plate 84 are best seen in the showings of FIGURES 4 and 5. Also fixedly secured to and extending downward from the bushing support 82 is an eye bolt 85 to which may be secured a cable or rod (not shown) by means of which the trolley collector 41 may be manually moved along the busway system to the desired location.

Rotatably secured at the four corners of the insulator body 78 are conductive metal wheels 86 electrically connected to the conductive end plates 80 and bushing support 82 by the conductive straps 87. As best seen in the showing of FIGURE 4, the trolley wheels 86 are seated upon and ride along the electrically conductive flat grounding strips 60 of the enclosure sections so that the entire depending structure of the trolley collector 41 is electrically grounded and thus presents no shock hazard to personnel.

Rotatably secured to depending legs of the insulator body 78 for rotation in a horizontal plane are a pair of longitudinally spaced wheels 88 so vertically positioned as to be disposed in tandem between the down turned flanges 49 of the rail enclosure which define the open slot extending lengthwise along the bottom of the enclosure. The effective diameter of the wheels 88 is just slightly less than the slot width so that the wheels will roll if they engage either of the flanges 49 but will not normally engage both simultaneously.

The insulator body 78 is provided with three laterally spaced parallel slotted channels molded or cut downward into the body from the upper surfaces thereof and designated generally as 89. Extending longitudinally along the bottom of each such channel 89 and secured to the insulator body 78 as by means of the screws 90 are the conductive metal strips 91 through which are upwardly projected the locating pins 92. Centered by the pins 92 and extending upwardly therefrom are the compression springs 93 having their upper ends disposed in bottom recesses formed in the collector shoes 94, which latter are generally rectangular in shape when viewed in plan, having their longitudinally disposed opposite ends chamfered as at 95.

The collector shoes 94 are of the same general size and shape in horizontal cross section as the slotted apertures 96 cut through the insulator cover plate 79 so that the springs 93 bias the collector shoes upward through the rectangular openings 96 and into engagement with the current conductor rails 68, as shown in FIGURE 4, the collector shoes 95 being prevented from displacement free of the trolley by means of the lower peripheral flanges 97 formed on the shoes which engage the underside of the insulator cover plate 79 in any case where the spring 93 is enabled to elevate the collector shoe 94 to such a point. Good electrical contact between the collector shoes 94 and conductive metal strips 91 is provided by the metallic braid 98 interconnecting the shoe with the strip.

The electrical current is carried from the conductive strips 91 to its point of utilization through the electrical conductors 99 secured by spade lugs 100 thereto, the conductors 99 passing downward through the bushing 83 into the cable 101. As best seen in the showing of FIGURE 3, the trolley collector is illustrated as being provided with three laterally spaced collector shoes 94 with one such shoe being provided for engagement with each of the conductor rails 63 in the manner seen in FIGURE 4. For heavier current carrying capacity the trolley collector may be provided with additional collector shoes 102 to provide a pair of shoes in tandem relation for each conductor rail, as is best illustrated in the showing of FIGURE 8 in phantom outline, such additional shoes being projectable through rectangular openings which would be cut through the insulator cover plate 79 in the region designated as 103. Each such additional collector shoe would of course be connected electrically in parallel with the collector shoe 94 with which it is in tandem or longitudinal alignment.

For insertion into and removal from the busway system of the trolley collector 41, the system may be provided at spaced points along its length with openable doors 42 or the like which afford access to the interior of system through the side wall thereof. Preferably, these side access doors are of the construction described in detail in our copending application hereinbefore referred to, but any other suitable provision may be made for insertion and removal of the trolley from the busway system without interrupting the electrical continuity of the current conductor rails 63 and the grounding strips 60.

Having now described our invention in connection with particularly illustrated embodiments thereof, it will be appreciated that modifications and variations thereof may now occur from time to time to those persons normally skilled in the art without departing from the essential scope or spirit of our invention, and accordingly it is intended to claim the same broadly as well as specifically as is indicated by the appended claims.

What is claimed to be new and useful is:

1. A current collector trolley device for use in conjunction with an enclosed conductor system which system includes enclosure sections of hollow generally rectangular cross section formed of electrical insulation material having a top wall below which is disposed a plurality of side by side parallel extending spaced apart conductor rails having downwardly facing contact surfaces, a pair of depending side-walls which turn inwardly toward one another at their bottom edges to form a pair of longitudinally extending bottom walls defining therebetween a central longitudinally extending slot of substantially constant width and which bottom walls carry on their upper surfaces conductive grounding tracks coextensive with the length of the enclosure, said current collector trolley comprising in combination, (a) a body of insulator material provided with parallel extending slotted channels recessed downward into the body from the upper surface thereof and within each of which channels extends longitudinally along the bottom thereof a conductive metal strip through which upwardly projects at least one locating pin about which is disposed a compression spring having its lower end seated at the channel bottom and having its upper end disposed within a bottom recess formed in a current collector shoe of generally rectangular shape when viewed in plan, each of said current collector shoes being provided with lower peripheral flanges extending laterally therefrom and being electrically connected to the aforesaid conductive strip by a flexible electrical conductor interconnecting the same, said collector shoes being laterally spaced so as to each contact one of the above-lying conductor rails, (b) an insulator cover plate detachably securable upon the upper surface of the collector shoe carrying insulator body and being provided with slotted apertures cut therethrough of the same size and shape as the horizontal cross-section of the current collector shoes above the flanges of the latter and positioned so that the current collector shoes are biased upward through said rectangular apertures by the aforesaid compression springs but are prevented from moving completely therethrough by engagement of the collector shoes bottom flanges with the underside of said insulator cover plate.

(c) a plurality of electrically conductive wheels secured to and supporting said body of insulating material, said wheels being disposed for rotation in parallel vertical planes spaced apart so that said wheels seat and ride upon the conductive grounding tracks carried by the enclosure bottom walls, (d) means carried by said collector shoes carrying insulator block and extending downward into said enclosure slot effective to prevent more than a predetermined minimal lateral shifting of said trolley collector as the latter moves longitudinally through the said enclosure, (e) an electrically conductive structure including opposite end plates extending vertically downward through the enclosure slot and being fixedly secured at their upper ends to the opposite ends of such collector shoes carrying insulator body and being electrically connected to said conductive wheels by means extending therebetween, the lower ends of said end plates extending below said slot and carrying a conductive structure including a cable clamping bushing through which electrical conductors may be led for electrical connection to the conductive strips and contact shoes carried by said insulator body.

2. A current collector trolley device for use in conjunction with an enclosed conductor system which system includes enclosure sections of hollow generally rectangular cross section formed of electrical insulation material having a top wall below which is disposed a plurality of side by side parallel extending spaced apart conductor rails having downwardly facing contact surfaces, a pair of depending side-walls which turn inwardly toward one another at their bottom edges to form a pair of longitudinally extending bottom walls defining therebetween a central longitudinally extending slot of substantially constant width and which bottom walls carry on their upper surfaces conductive grounding tracks coextensive with the length of the enclosure, said current collector trolley comprising in combination, a main body member of insulating material having a plurality of laterally-spaced open-topped recesses, the lateral spacing of said recesses being in correspondence with the lateral spacing of said conductor rails, spring-pressed current collector shoes respectively disposed and held captive in said recesses for resilient engagement with said conductor rails, a plurality of paired electrically conductive wheels journalled upon said main body of insulating material for rotation about parallel horizontal axes spaced fore and aft of the center of said body with each pair of said wheels axially spaced apart in correspondence with the lateral spacing of said grounding tracks whereby at least two wheels in tandem relation on each side of said main body seat and ride upon one of said grounding tracks, all of said conductive wheels being electrically interconnected and insulated from said current collector shoes, and means carried by and depending from said main body member of insulating material and disposed between the slot defining bottom walls of said rail enclosure sections to limit lateral shifting of the trolley during travel thereof longitudinally along said enclosure.

3. A current collector trolley device as defined in claim 2 wherein said recesses are each of a length exceeding twice the length of the current collector shoe disposed therein and are each fitted in the bottom thereof with a current conductive strip having means spaced along the length thereof for electrically connecting to said strip at least one of said collector shoes in a longitudinally adjusted position in each said recess.

4. A current collector trolley device as defined in claim 3 wherein each of said current collector shoes is disposed in its accommodating recess in said main body of insulating material in laterally and longitudinally spaced relation with respect to its next adjacent shoe whereby to provide substantial spacing between the several shoes effective to preclude current leakage therebetween.

5. A current collector trolley device as defined in claim 2 characterized by the provision of means supported by and depending from said main body member of insulating means for electrically interconnecting the fore and aft pairs of said electrically conductive wheels, said means including a main portion extending lengthwise of said insulating body member in such spaced underlying relation thereto as to be external of the enclosure section when said trolley is disposed therein for travel therealong.

6. A current collector trolley device as defined in claim 2 wherein said last-mentioned means includes a pair of flanged wheels disposed in tandem relation lengthwise of the insulating main body member and journalled for rotation about vertical axes lying in the longitudinally extending vertical median plane of said insulating body member.

No references cited.

ARTHUR L. LA POINT, *Primary Examiner.*

S. KRAWCZEWICZ, *Assistant Examiner.*